(12) United States Patent
Cardona et al.

(10) Patent No.: US 6,899,497 B2
(45) Date of Patent: May 31, 2005

(54) MOBILITY AID SECUREMENT FOR VEHICLES

(76) Inventors: Edgardo Cardona, 11073 NK-7 Highway, Atchison, KS (US) 66002; Joseph Takacs, Jr., 1621 Alvamar Dr., Lawrence, KS (US) 66047; Thomas C. Adams, 1223 Yellowstone Rd., Cleveland Heights, OH (US) 44121; Stephen I. Reger, 5610 Spring Grove Dr., Solon, OH (US) 44139

( * ) Notice: Subject to any disclaimer, the term of this patent is extended or adjusted under 35 U.S.C. 154(b) by 0 days.

(21) Appl. No.: 10/293,660

(22) Filed: Nov. 13, 2002

(65) Prior Publication Data

US 2003/0190208 A1 Oct. 9, 2003

Related U.S. Application Data

(60) Provisional application No. 60/332,166, filed on Nov. 14, 2001.

(51) Int. Cl.[7] .................................................. B60P 7/08
(52) U.S. Cl. ................. 410/12; 410/4; 410/7; 410/8; 410/23; 410/100
(58) Field of Search ................. 410/3, 4, 7, 8, 410/11, 12, 23, 51, 100; 296/65.04; 248/499; 280/304.1

(56) References Cited

U.S. PATENT DOCUMENTS

| | | | |
|---|---|---|---|
| 3,730,552 A | 5/1973 | Clark | |
| 4,019,752 A | 4/1977 | Leon et al. | |
| 4,093,303 A | 6/1978 | Nelson | |
| 4,103,934 A | 8/1978 | Arnholt et al. | |
| 4,407,616 A | * 10/1983 | Hinze | |
| 4,511,171 A | 4/1985 | Petersen | |
| 4,588,340 A | * 5/1986 | Howard | 410/7 |
| 4,623,289 A | 11/1986 | Apostolos | 410/7 |
| 4,671,713 A | * 6/1987 | Lenkman | 410/7 |
| 4,730,964 A | * 3/1988 | Joyner | 410/23 |
| 4,886,403 A | 12/1989 | Gresham | 410/10 |
| 4,995,775 A | 2/1991 | Gresham | 410/10 |
| 5,026,225 A | * 6/1991 | McIntyre | 410/23 |
| 5,186,585 A | * 2/1993 | Sousa et al. | 410/9 |
| 5,344,265 A | * 9/1994 | Ullman et al. | 410/3 |
| 5,391,030 A | * 2/1995 | Lee | 410/12 |
| 5,489,170 A | * 2/1996 | Inoue et al. | 410/7 |
| 5,567,095 A | * 10/1996 | James et al. | 410/7 |
| 5,628,595 A | * 5/1997 | Harris | 410/7 |
| 5,888,038 A | 3/1999 | Ditch et al. | 410/7 |
| 6,113,325 A | 9/2000 | Craft | 410/7 |
| 6,149,359 A | 11/2000 | Cardona | 410/11 |
| 6,171,035 B1 | * 1/2001 | McLaurin et al. | 410/7 |
| 6,231,283 B1 | * 5/2001 | Stowers | 410/9 |
| 6,287,060 B1 | * 9/2001 | Girardin | 410/7 |
| 6,352,396 B1 | * 3/2002 | Budd et al. | 410/8 |
| 6,406,230 B1 | * 6/2002 | Mason et al. | 410/7 |
| 6,471,454 B1 | * 10/2002 | Koller | 410/7 |
| 6,524,039 B1 | * 2/2003 | Magnuson et al. | 410/23 |
| 6,685,403 B2 | * 2/2004 | Constantin | 410/7 |

\* cited by examiner

Primary Examiner—Stephen Gordon
(74) Attorney, Agent, or Firm—Young & Basile, P.C.

(57) ABSTRACT

The invention is an apparatus for securing a mobility aid to the interior of a motor vehicle, such as a bus. The invention includes one or more retractors typically positioned forward of the mobility aid, and one or more retractors typically positioned behind the mobility aid. Some or all of the retractors are provided with a powered tension apparatus for providing opposed tension to the front and rear of the mobility aid, securing it from movement in the vehicle. The tensioning system is capable of being remotely controlled, enabling the securement and release of the mobility aid to be performed easily by either the mobility aid occupant or an operator in the motor vehicle.

24 Claims, 12 Drawing Sheets

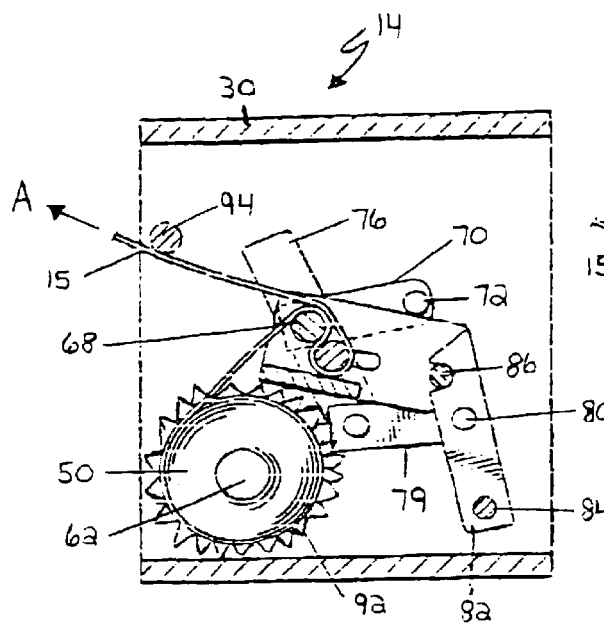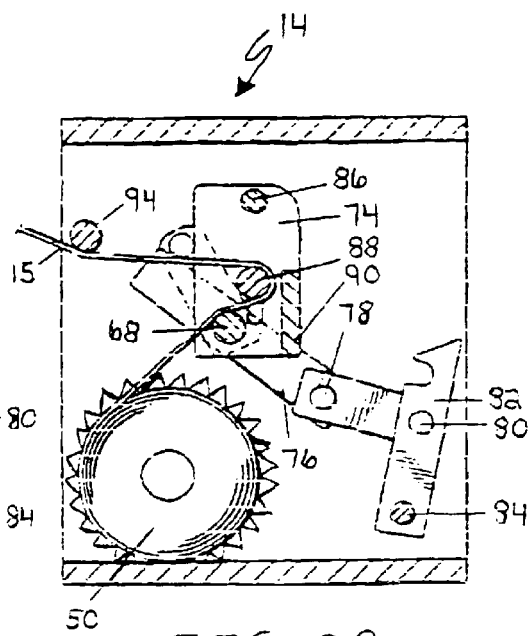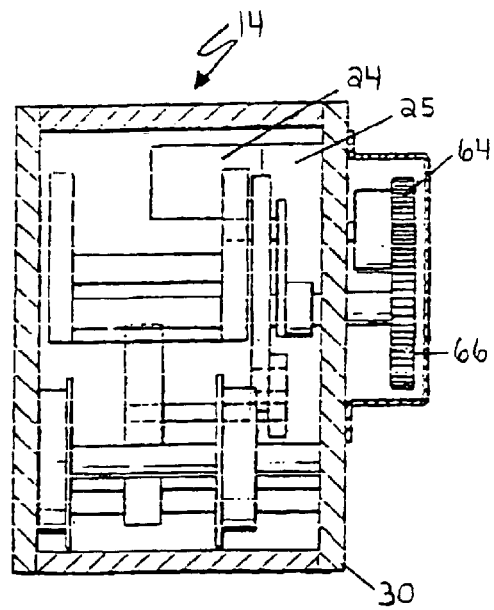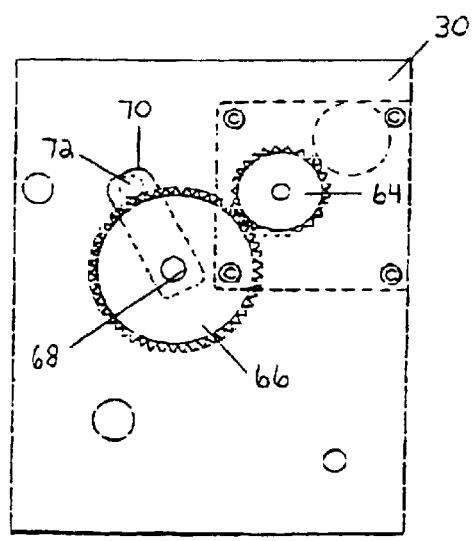

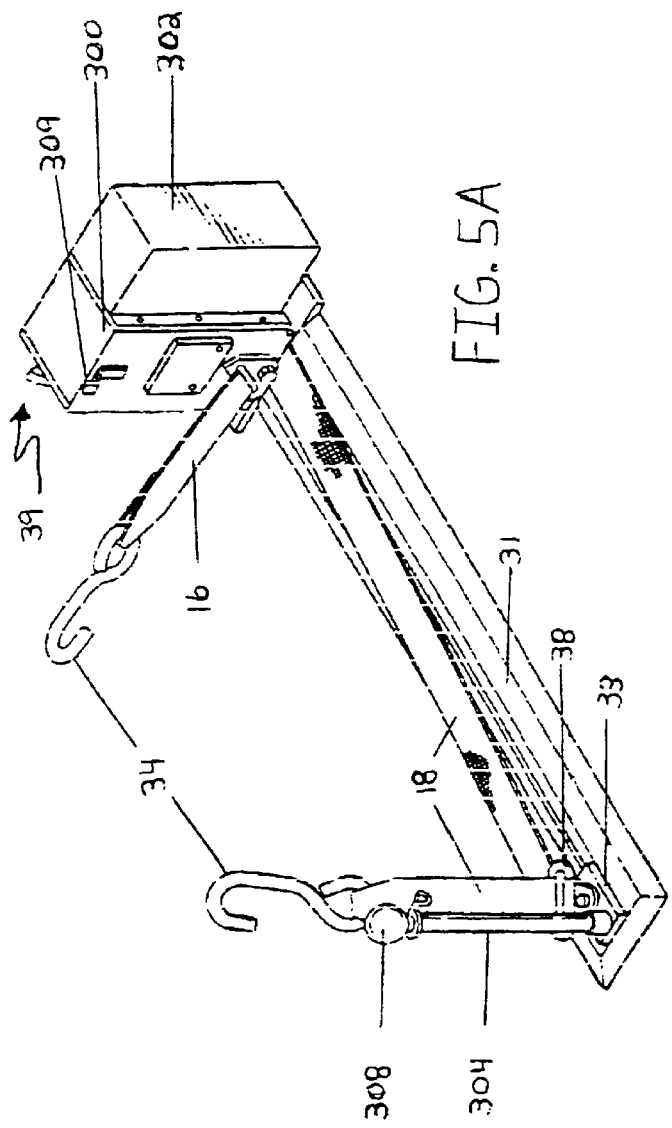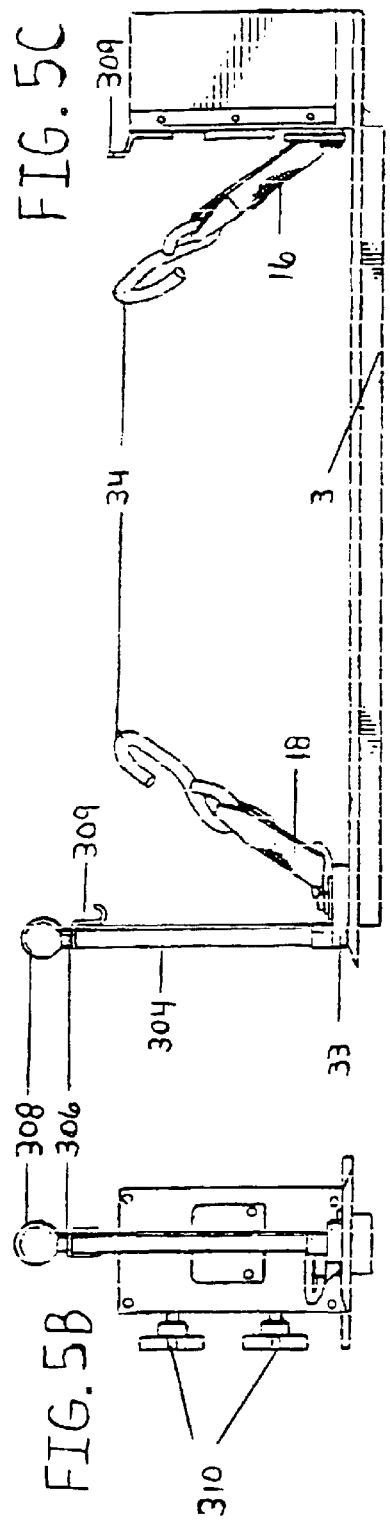

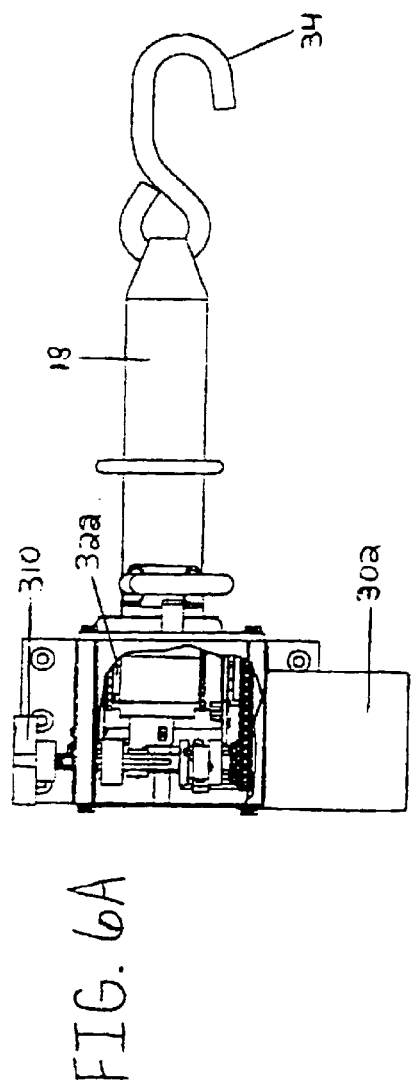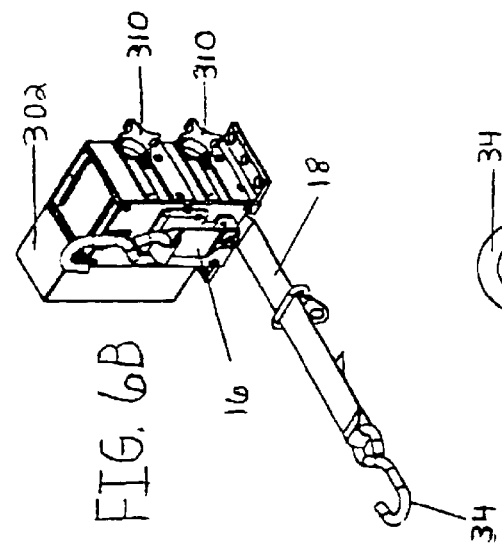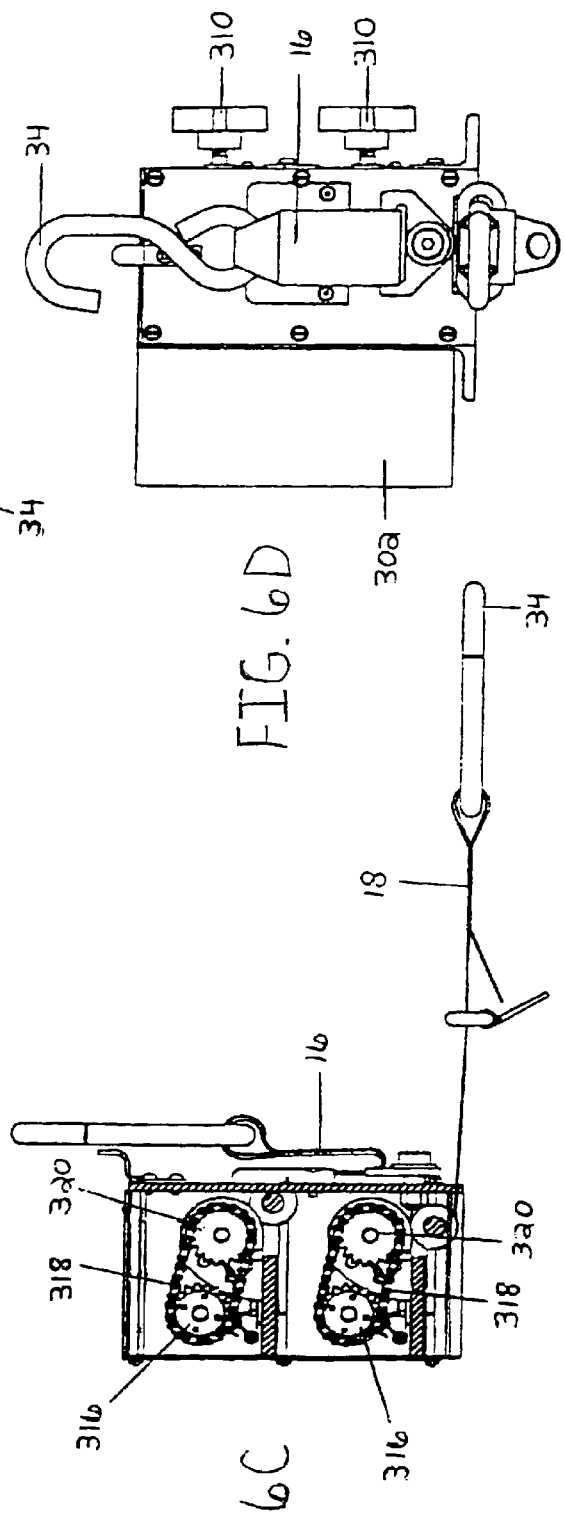

```
;;;;;Kinedyne code - extended to four motors.
;;;;;working with pic16f84
;file=kine1.asm           updated 02-20-00, 13:50
        list    P=16F84, R=DEC
        include "C:\mplab\p16f84.inc"
        __config ( _CP_OFF & _PWRTE_ON & _RC_OSC & _WDT_OFF )
;;;;;equates
Maxcnt  equ     4
;;;;;notes, defining I/O lines
;RA0=   trcoil
;RA1    vcc1
;RA2    vcc2
;RA3    vcc3
;RA4    vcc4    needs 4.7K resistor pull-up.
;RB0    tled
;RB1    rled
;RB2    gosw
;RB3    trsw
;RB4    sense1
;RB5    sense2
;RB6    sense3
;RB7    sense4
;;;;;
;;;;;variables
        cblock  0x0C
                long
                shrt
                max
        endc
;;;;;vectors
        org     0x00
        goto    Mainline
        org     0x04
Stop                                    ;no interrupts
        goto    Stop
        org     0x05
Mainline
        call    Initial                 ;initialize ports A and B
        bsf     PORTA,1                 ;make sure motor off, VCC1 off
        bsf     PORTA,2
        bsf     PORTA,3
        bsf     PORTA,4
        bcf     PORTA,0                 ;turn off trcoil too, i.e. set "NC"
Mainloop
        btfsc   PORTB,2                 ;skip if go sw "grounded," tied high.
        goto    Mainloop
Debounce
        movlw   8                       ;add hysteresis, 20 ms
        call    Delay
        btfss   PORTB,2                 ;wait for return to "high"
        goto    Debounce
Startmot
        bcf     PORTB,0                 ;clear tension LED
        bcf     PORTB,1                 ;clear release LED
        movlw   Maxcnt                  ;set count down for # motors on
        movwf   max
        btfsc   PORTB,3                 ;check trsw
        bsf     PORTA,0                 ;set trcoil to normally open position
        movlw   150
        call    Delay                   ;delay 200 ms, allow TR relay to set
        bcf     PORTA,1                 ;turn on VCC relays [inputs inverted]
        bcf     PORTA,2
        bcf     PORTA,3
        bcf     PORTA,4
        movlw   255
        call    Delay                   ;wait for motors to turn on [300 ms]
                                        ;allowing start currents to settle down
;
Tension
        btfsc   PORTB,4                 ;turn off motor-x if max current reached
        call    Stopmot1                ;turn off motor 1
        btfsc   PORTB,5                 ;comment out if not testing 2-4
        call    Stopmot2
        btfsc   PORTB,6
```

FIG. 10A

```
        call    Stopmot3
        btfsc   PORTB,?
        call    Stopmot4
        movf    max,W
        btfss   STATUS,Z        ;z set if zero
        goto    Tension         ;go it!
Setled
        btfss   PORTB,3         ;test trsw, did tension or release?
        bsf     PORTB,1         ;low, set release led
        btfsc   PORTB,2
        bsf     PORTB,0         ;high, set tension led
        goto    Mainloop
                                ;add timeout here?
;
;subroutines
;
Stopmot1
        bsf     PORTA,1         ;stop motor 1
        decf    max,F
        return
Stopmot2
        bsf     PORTA,2         ;stop motor 2, etc
        decf    max,F
        return
Stopmot3
        bsf     PORTA,3
        decf    max,F
        return
Stopmot4
        bsf     PORTA,4
        decf    max,F
        return
;
;;;;;;;more subroutines
;
Initial                         ;configure port
        bsf     STATUS,RP0      ;set bank 1
        movlw   B'00000111'     ;set I/O pins PORTA
        movwf   TRISA
        movlw   B'00111111'     ;set I/O pins PORTB
        movwf   TRISB
        bcf     STATUS,RP0      ;return bank 0
        return
Delay
        movwf   long            ;set outer loop
Long_1
        call    Fsec            ;if delay loop
        decfsz  long
        goto    Long_1
        return
                                ;inner loop
Fsec
        clrf    shrt
        comf    shrt,F
Shrt_1
        decfsz  shrt,F
        goto    Shrt_1
        return
        end
```

FIG. 10B

MOBILITY AID SECUREMENT FOR VEHICLES

RELATED APPLICATION

This application is related to, and claims the benefit of priority from, U.S. Provisional Patent Application Ser. No. 60/332,166, filed Nov. 14, 2001.

This invention was made with government support under Grant No. R-42-HD34290 awarded by the Department of Health and Human Services. The government has certain rights in the invention.

FIELD OF THE INVENTION

This invention relates to devices for securing a wheelchair or other mobility aid to a vehicle. In particular, the invention includes a system utilizing webbed belts and a power system for providing tension on said belts.

BACKGROUND

Over the last two decades, it has become commonplace to accommodate wheelchair users in mass transit vehicles, such as buses, trains or airplanes. Such accommodations typically allow these persons to ride in the vehicle while remaining in a wheelchair or similar mobility aid, such as a powered scooter. It is desirable, under these circumstances, to secure the wheelchair to the vehicle for the safety of the user of the wheelchair, as well as the safety of other occupants of the vehicle.

While numerous methods and devices have been developed for securing wheelchairs and other mobility aids to the interior of vehicles, many of the methods and devices create inconveniences to both the mobility aid occupant and the operator of the vehicle. Also, because the mobility aid occupant is frequently restricted in body movement, it is desirable to provide mobility aid securement systems which are easily reached and manipulated by such passenger. In the alternative, if such securement systems are not manipulatible solely by the passenger, it is desirable to have them easily operable by the vehicle driver or a driver's assistant. It is also desirable to provide mobility aid securement systems which are easily repositioned within the vehicle to permit the space sometimes used by a mobility aid occupant to be readily converted for use by ambulatory passengers. For this reason, a wide variety of methodologies and apparatuses have been developed in the form of stowable restraints for mobility aids and mobility aid-using passengers. Preferably, however, such restraints should be positioned in the immediate vicinity of the area where a mobility aid will be secured. In known systems using a plurality of belts and anchors (belts and anchors which are stowed remotely, for example, in a storage locker), such belts and anchors frequently become lost, damaged or soiled when not in use. Additionally, this type of restraint almost always requires installation in the vehicle and attachment to the mobility aid by someone other than the mobility aid occupant.

It is also known to provide mobility aid securement systems which are secured to the vehicle and articulate between a stowed and an extended position. This type of technology is found in U.S. Pat. No. 6,149,359, issued to Cardona; U.S. Pat. No. 5,888,038, issued to Ditch et al., and U.S. Pat. No. 6,113,325, issued to Craft et al. Even these systems, however, have an important drawback in that it is difficult to provide the necessary engagement and manual tension to four discrete points on the mobility aid, in the fashion in which the securement apparatus for the mobility aid is usually attached to the vehicle, without the assistance of a person other than the mobility aid occupant.

There is a need, therefore, for a mobility aid tie-down system which is easily attached to the mobility aid by the mobility aid occupant alone, which is similarly easy to tension, and which is readily operable from a conveniently reached position. There is likewise a need for a mobility aid tie-down tensioning system which is power-assisted, permitting correct tension to be applied to the mobility aid by operation of electrical power, for example.

SUMMARY OF THE INVENTION

The invention is a simple-to-use, easily installed power securement system for mobility aids. The system is installed in mass transportation vehicles in such a fashion as to present no obstacle to the traveling public when the system is not in use, but yet is readily available for operation when needed by a mobility aid occupant. The system allows the same space in a vehicle to be used, alternatively, by mobility aid occupants and by ambulatory passengers. The components of the securement system are located in an area of the vehicle which may also be occupied by foldable seats usable by ambulatory passengers. Preferably, these seats may be easily moved away from the area to be occupied by a mobility aid user, and just as easily repositioned for conventional use as desired.

The system comprises one or more front tensioning assemblies and one or more rear tensioning assemblies located in proximity to a mobility aid station. The tensioning assemblies are mounted to the floor, walls or other structures of the vehicle in such a fashion as to provide the necessary securement to protect the mobility aid from movement in the event of a collision involving the vehicle. The tensioning elements of the system are provided with power-driven means as well as electronic feedback means to impart and maintain an appropriate amount of tension to the tensioning elements automatically.

In use by a mobility aid occupant, the system includes at least one front tensioning assembly having one or more webbed belts provided with one or more hooks to engage the front framework of a mobility aid. A pair of belts is arranged to provide laterally spaced positions for two hooks and belts, thereby ensuring that both the right front and left front portions of a mobility aid will be suitably engaged to restrict both fore, aft, lateral and vertical movement of the front of the mobility aid in relation to the vehicle. One or more rear tensioning assemblies are provided behind the mobility aid station in the vehicle, aft of the front tensioning assembly to permit one or more hooks and belts from a rear tensioning assembly to engage one or more portions of the rear of a mobility aid. Preferably, there are two cooperating rear tensioning assemblies, one located near the inboard part of the mobility aid station and one located near the outboard part of the mobility aid station. These rear tensioning assemblies provide securement of the mobility aid from forward movement as well as from lateral movement.

In operation, the front tensioning belts and rear tensioning belts and their associated hooks are affixed to the four corner areas of the mobility aid and placed under tension securing the mobility aid from fore and aft vertical or lateral movement.

Another feature of the present invention is the utilization of power-driven means, preferably electrical, to provide tension to the tensioning belts, and feedback means to ascertain when the belts have been placed under suitable tension. These tensioning and feedback means are preferably automatic and fail-safe.

The invention thus provides a convenient securement system for a mobility aid passenger utilizing a vehicle having a mobility aid station. The securement system is easily utilized by the mobility aid occupant without the assistance of others, and is likewise convenient to use by a person assisting the mobility aid occupant.

The mobility aid securement system has a powered tensioning means, thereby permitting appropriate tension to be supplied for securing the mobility aid in position in the vehicle without the need for manually tensioning the securing belts. The system is readily convertible to a stowed configuration, thereby minimizing obstruction or inconvenience to ambulatory passengers. This mobility aid securement system is not subject to being misplaced, soiled or damaged, and does not require complicated installation steps prior to each use.

These and other attributes of the invention will be apparent from a review of the detailed description of the preferred embodiment, and from the drawings and claims which follow.

BRIEF DESCRIPTION OF THE DRAWINGS

The description herein makes reference to the accompanying drawings wherein like referenced numerals refer to like parts throughout several views and wherein:

FIG. 2A is a cutaway side view of one embodiment of a rear tensioning assembly.

FIG. 2B is a cutaway side view of one embodiment of a rear tensioning assembly, showing the assembly in the relaxed, or untensioned, condition.

FIG. 2C is a cutaway front view of a rear tensioning assembly, showing the relationship of the motor, transmission, spool and locking mechanism.

FIG. 2D is a side view of a rear tensioning assembly, showing the relationship of the housing, transmission and driven gear of the locking assembly.

FIG. 5A is a perspective view of the front tensioning assembly, showing the belts in the extended position.

FIG. 5B is a side view of the front tensioning assembly with the belts removed.

FIG. 5C is a front view of the front tensioning assembly with the belts in the extended position.

FIG. 6A is a top cutaway view of the front tensioning assembly with the track and carriage assembly removed for clarity.

FIG. 6B is a perspective view of the front tensioning assembly with the track and carriage removed for clarity.

FIG. 6C is a cutaway side view of the front tensioning assembly with the track and carriage removed for clarity.

FIG. 6D is a front view of the front tensioning assembly with the track and carriage removed for clarity.

FIGS. 10A and 10B are a listing of the micro controller program utilized to control operation of the invention.

DETAILED DESCRIPTION OF THE EMBODIMENT

Figure 1:
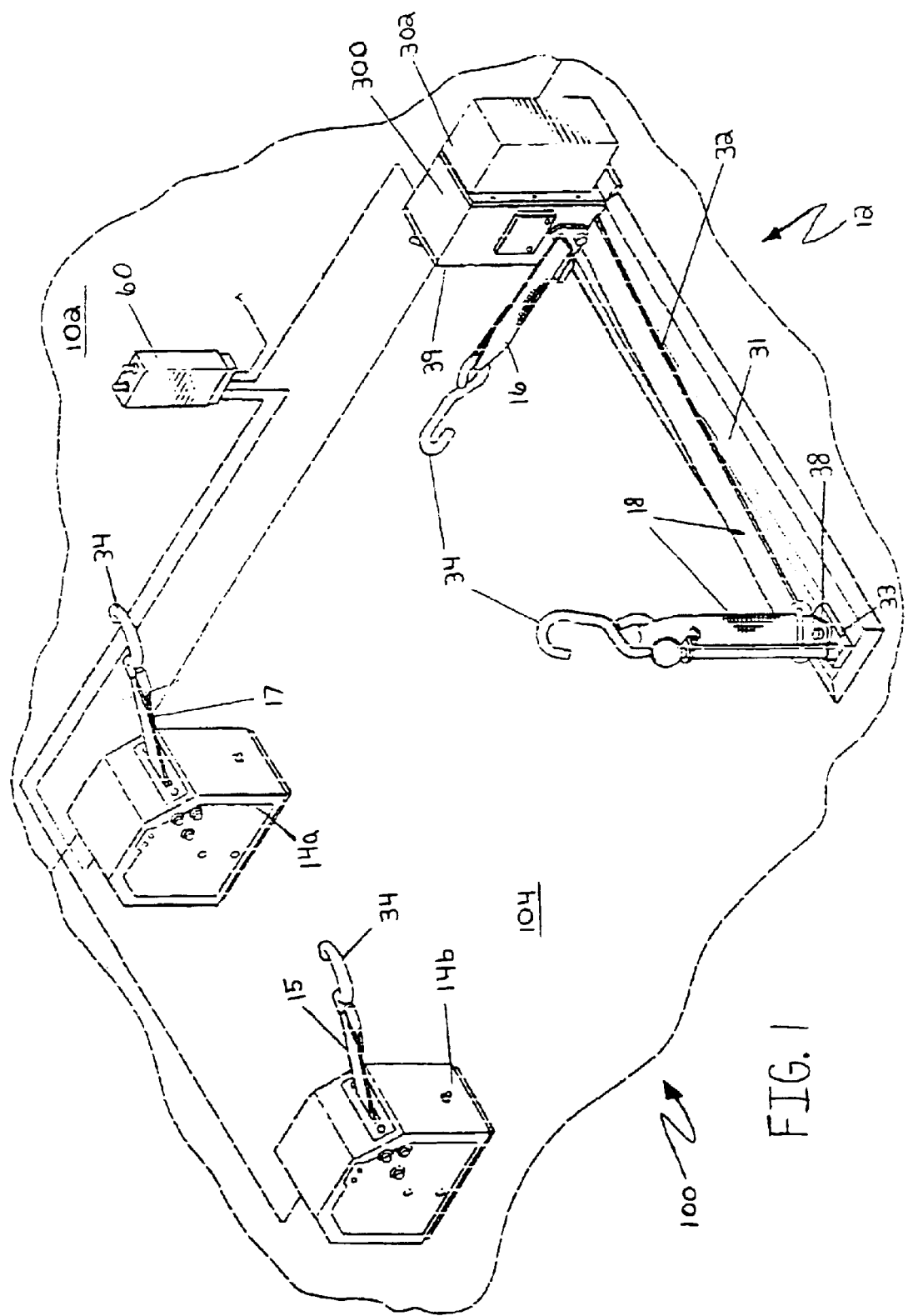
FIG. 1 is a perspective view of a typical mobility aid station in a vehicle, showing the major components of the invention.

With reference first to FIG. 1, a mobility aid station 100 is provided in a vehicle having a floor 104 and one or more side walls 102. The station 100 is typically located adjacent one or more seat assemblies (not shown), including seat assemblies having fold-up benches, which can be positioned for conventional seating if desired. A control console 60 is provided for providing signals and power to tension the front tensioning assembly 12 and rear tensioning assemblies 14*a* and 14*b*. The console 60 is preferably mounted to be convenient for operation by a mobility aid user or the vehicle operator.

The front tensioning assembly 12 is depicted in FIG. 1 and utilizes a belt guide 38 that cooperates with a roller-equipped carriage 33 which, in turn, is fitted to a track 31 mounted in or on the floor 104 of the vehicle. The carriage 33 rides within a channel 32 in the track, permitting the belt guide 38 to be positioned transversely at any position along the length of track 31, and when in use preferably at a position close to centerline of the vehicle, placing the belt guide 38 proximate the centerline of the vehicle on the inboard aisle side of the mobility aid. Belt guide 38 cooperates with a belt retractor mechanism 39 provided with a belt 18, thereby ensuring the positioning of one end of the belt 18 associated with the belt retractor mechanism 39 to be located on the mobility aid near the centerline of the vehicle in which the mobility aid is positioned.

The belt guide 38 is attached to a carriage 33 which moves within track 31 assembly mounted perpendicular to the fore and aft centerline of the vehicle. The carriage 33 permits belt guide 38 to be moved laterally from the inboard to the outboard side of the mobility aid station 100. A spring-loaded catch may be provided to restrain the carriage 33 from movement in relationship to the track 31. When the securement system is in use, the carriage 33 and belt guide 38 will be moved from a retracted position near the outboard side of the mobility aid station to a position closer to the centerline of the vehicle.

A pair of rear tensioning assemblies 14*a* and 14*b* are positioned at the opposite end of the mobility aid station 100 from the track 31, front inboard belt 18 and front outboard belt 16.

The two rear tensioning assemblies 14*a* and 14*b* are provided with belts 17, 15 and hooks 34. It is desirable to locate one rear tensioning assembly 14*b* near the inboard rear of the mobility aid station 100 and another rear tensioning assembly 14*a* near the outboard rear of the mobility aid station 100, separated by sufficient distance to provide substantial lateral support to the mobility aid when the belts 15 and 17 are under tension.

As shown in FIGS. 2A–2D, associated with each rear tensioning assembly are housing 30, motor 24 and transmission 25 adapted to provide selective tension to belts 15 and 17. Belts 15 and 17 can be tensioned or relaxed selectively by operation of the motor 24 associated with each tensioning assembly 14. The motors 24 may be located either inside or outside the housings 30.

The mechanical operation of the tensioning assemblies 14a and 14b is depicted in FIGS. 2A–2D. In FIG. 2A, a cutaway view of the retractor housing reveals the basic elements of each tensioning assembly. A length of webbed belt 15 is wound onto and extends from a spring-biased spool 50. The spool 50 is pivotally mounted on axle 62, and the spool 50 is biased to urge the belt 15 to be wound about the spool 50 in a counterclockwise direction as shown in FIG. 2A, thereby urging the belt 15 to be wound on the spool 50 in the "retracted" condition. Tension on belt 15 in the direction of arrow A tends to withdraw the belt 15 from the spool 50 against the forces of the biasing spring. FIG. 2A shows the retractor assembly in the "locked" and tensioning position. Assume that the distal end of belt 15, provided with a hook as hereinbefore described, is secured to a portion of a mobility aid frame, and tension is being placed on the belt 15 by the spring-biasing of the spool 50 as above described. From FIG. 2C, it will be appreciated that motor 24 and transmission 25 are arranged to convert relatively low-torque, high-speed rotary motion from the armature of motor 24 through transmission 25 to create a relatively high-torque, low-speed output from the transmission 25, thereby driving interim gear 64. Motor 24 is bi-directional, and the direction of rotation may be selected by applying appropriate polarity to the motor circuit in a well-known fashion. Interim gear 64 serves to drive main gear 66, which in turn is affixed to rotation pin 68 and to control bar 70 shown in phantom view in FIG. 2D. It will also be appreciated that rotation of main gear 66 in a clockwise direction urges control bar 70 and its associated engaging pin 72 in a clockwise direction. As shown in FIG. 2A and FIG. 2B, engaging pin 72, likewise driven in a clockwise arc, is thereby brought into contact with the edge of articulating bracket 74, which also rotates about the axis of rotation pin 68. Movement of the engaging pin 72 rotates the articulating bracket 74 in a clockwise direction Rotation of the articulating bracket 74 further results in clockwise rotation of the cam 76 which is axially connected through cam/link axle 78 to interim link 79 and hook/link axle 80 to locking hook 82, which is pivotally connected to the housing 30 by locking hook pivot 84. As can be seen from FIG. 2A, the clockwise rotation of the control bar 70, the articulating bracket 74 and the cam 76 causes locking hook 82 to engage the locking pin 86 at the same time that belt 15 is folded back against itself around rotation pin 68 and knurled pin 88. The outer circumference of knurled pin 88 is knurled or roughened to create a high coefficient friction between the surface of belt 15 and knurled pin 88. Knurled pin 88 is also brought into engagement with the belt 15, trapping the belt 15 between rotation pin 68 and knurled pin 88.

Release of the tension and friction on the belt is shown in FIG. 2B and FIG. 2D. It will be appreciated that counter-clockwise rotation of the main gear 66 results in counter-clockwise rotation of the control bar 70, with corresponding counter-clockwise rotation of the articulating bracket 74 and cam 76. This rotation releases locking hook 82 from locking pin 86, and results in rotation of the knurled pin 88 to a position radially clockwise from and spaced apart from rotation pin 68, thereby releasing the grip on belt 15 created by rotation pin 68 and knurled pin 88, thereby once again permitting belt 15 to be easily pulled from spool 62 against the spring bias.

As shown in both FIG. 2A and FIG. 2B, the stop 90 associated with articulating bracket 74 will be brought into engagement with a toothed spool end 92 upon clockwise rotation of the articulating bracket 74. Counter-clockwise rotation of the articulating bracket 74 withdraws stop 90 from engagement with the toothed end of the spool 92. In this fashion, the positioning of stop 90 in relation to the toothed end 92 of the spool creates a second positive stop preventing rotation of the spool 50, even in the event that the frictional forces generated by the rotation pin 68 and knurled pin 88 are insufficient to otherwise restrain movement of the belt 15. Guide 94 directs the belt from the housing.

Figure 3:
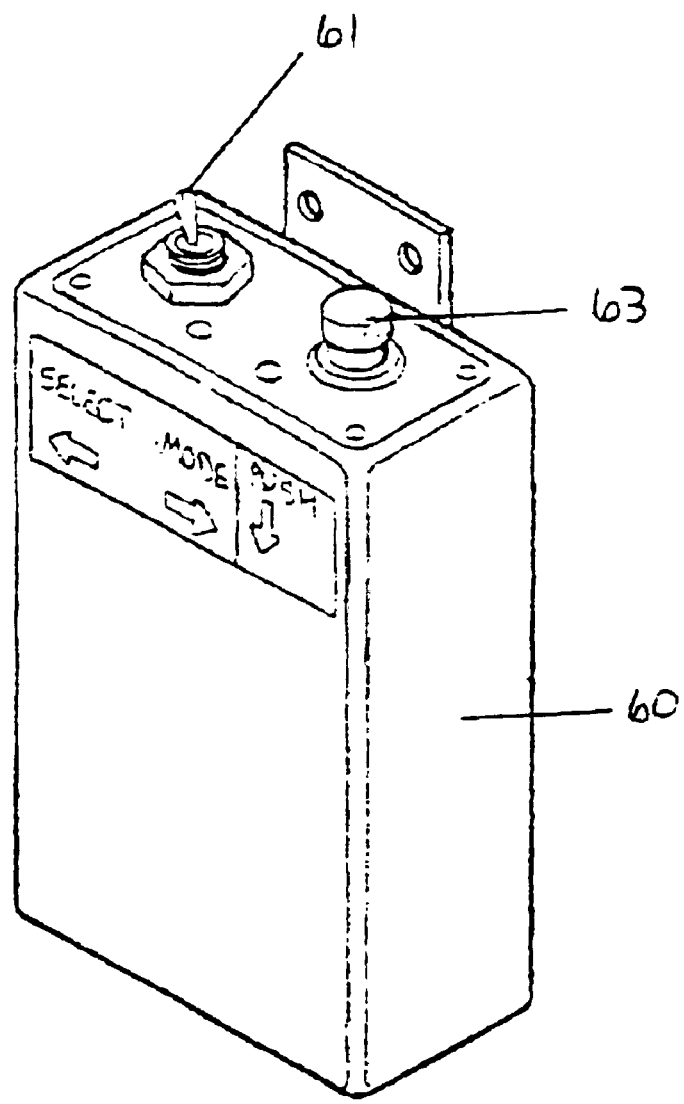
FIG. 3 is a perspective view of the control box.
Figure 9A:
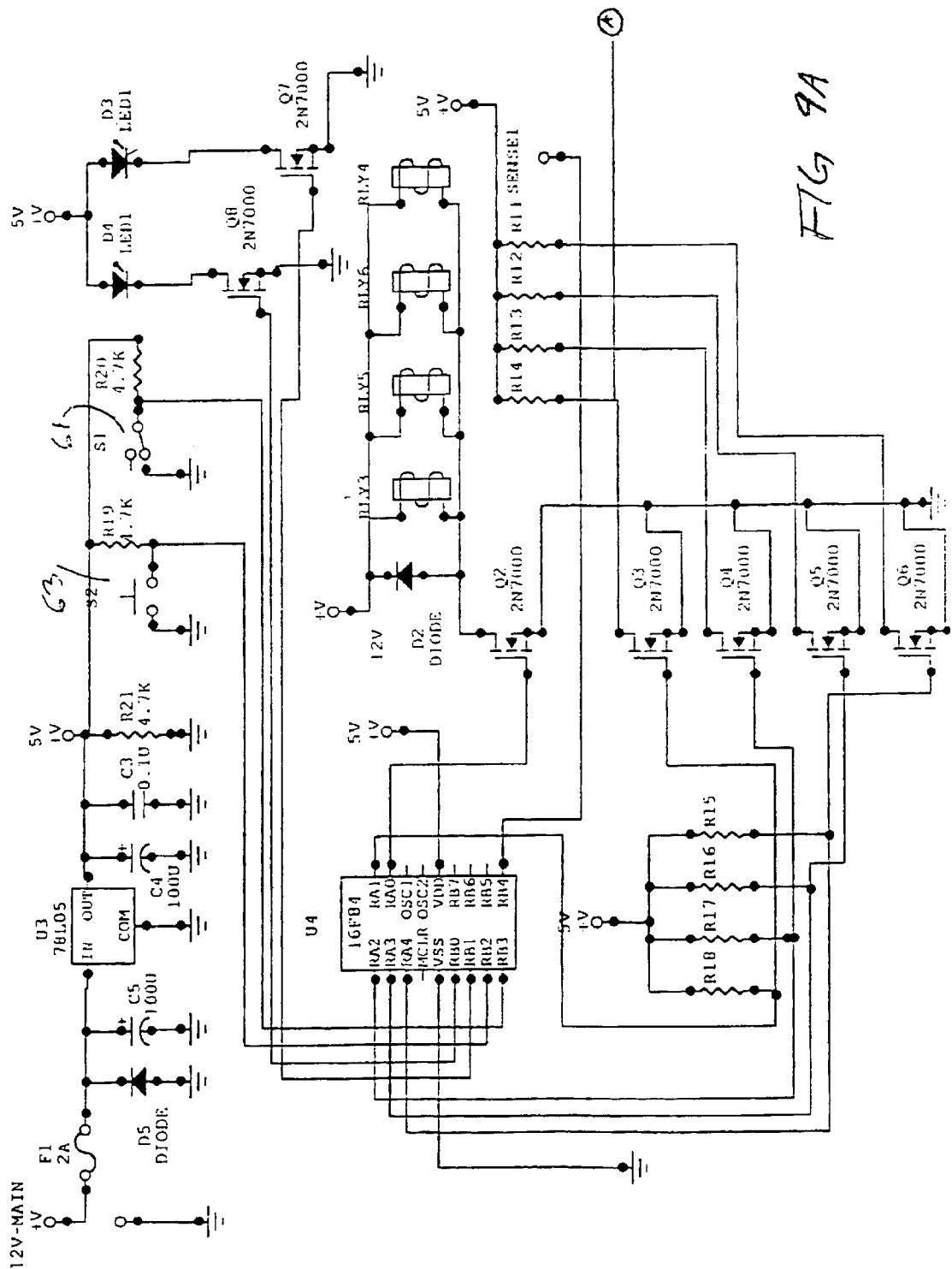
FIG. 9A is a schematic of the main electrical circuit for driving the motors of the invention.
Figure 9B:
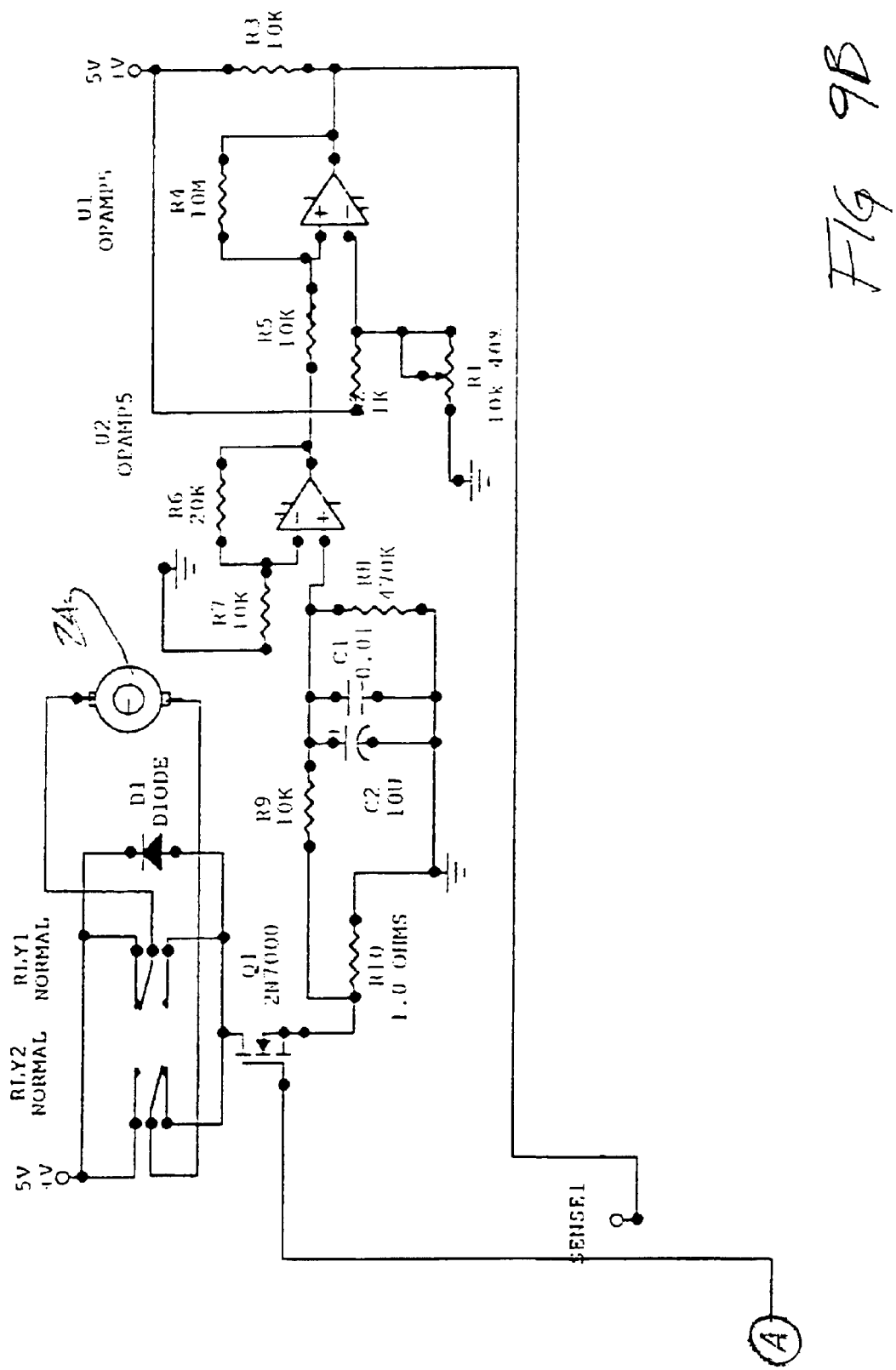
FIG. 9B is a schematic of one representative motor drive and sense circuit.

Operation of the system is controlled by the controller 60 as shown in FIG. 3, which incorporates a microcontroller and associated circuitry as depicted in FIGS. 9A and 9B in schematic form. Microcontroller U4 controls the operation of motors 24 in both the tension and release directions in response to the position of the tension/release switch 61 and operation of the activation switch 63 as will be described in more detail herein. When the tension/release switch 61 is positioned to the "tension" position and the activation switch 63 is operated, appropriate electrical signals are sent to electric motors 24 contained within each tensioning assembly, thereby tensioning and locking the belts 15, 17, 16 and 18, as well as locking the spools 50 and securing the belts against rotation pin 68 and knurled pin 88 as above described. Movement of the tension/release switch 61 to the "release" position and operation of the activation switch 63 likewise releases the locking elements above described, thereby allowing the belts to be withdrawn from the spools 50 within each tensioning assembly.

Figure 4A:
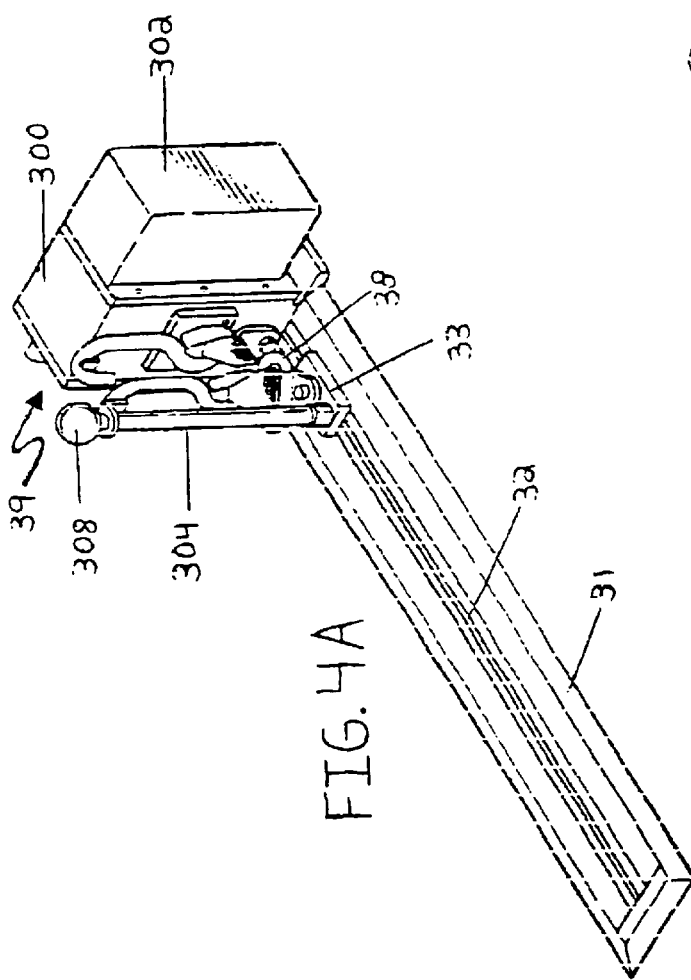
FIG. 4A is a perspective view of the front tensioning assembly, showing the belts in the retracted position.
Figure 4B:
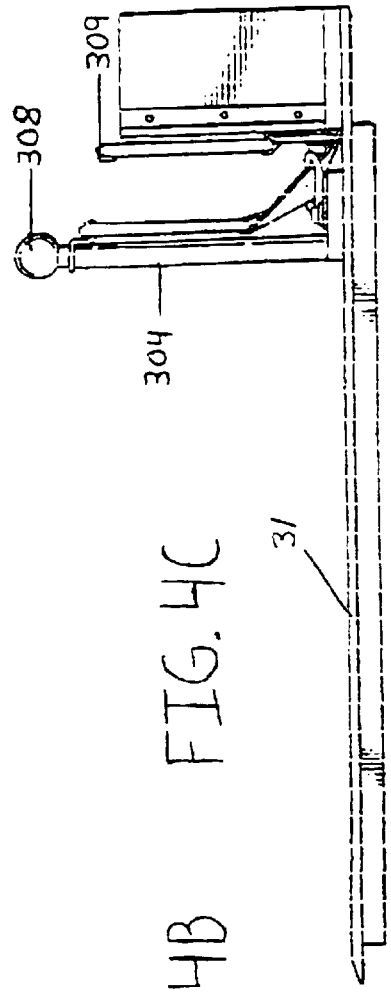
FIG. 4B is a side view of the front tensioning assembly, showing the belts in the retracted position.
Figure 4C:
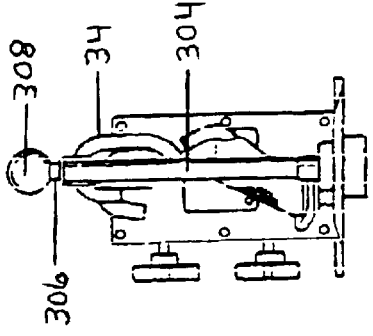
FIG. 4C is a front view of the front tensioning assembly, showing the belts in the retracted position.

With reference now to FIGS. 4A–4C, as well as to FIGS. 5A–5C, it will be understood that front retractor mechanism 39 may be operated to apply tension to front belts 16 and 18 with attached hooks 34, tending to pull a mobility aid affixed to hooks 34 forward toward the front of the vehicle. Assuming that the rear of the mobility aid is secured, front belts 16 and 18 will thereby provide tension to secure the mobility aid from both forward, aft, lateral and vertical movement. In the preferred embodiment, this tension is provided by tensioning motors which are operatively coupled to drive mechanisms located within housings 300 of retractor mechanism 39.

FIGS. 4A–4C depict the components of the front tensioning assembly 12 in a stowed or retracted position. The assembly consists of a low-profile track 31 provided with a channel 32. Low profile track 31 is designed to be securely affixed to the floor of a vehicle, such as a bus. Disposed at the outboard end of track 31 is a reel housing 300 and a motor housing 302. Slidably mounted within the channel 32 of track 31 is a carriage 33 to which is affixed a belt guide 38, a plunger housing 304, a plunger 306 equipped with a grip 308. Carriage 33, plunger housing 304, plunger 306 and grip 308, together with belt guide 38 may be selectively positioned along the length of track 31, engaging track 32. Hooks 34 are attached to the ends of inboard belt 16 and outboard belt 18, shown in their stowed position in FIGS. 4A–4C. A pair of hangers 309 are mounted, respectively, to the plunger housing 304 and the reel housing 300 to support hooks 34 when the belts 16 and 18 are in the retracted position. Reel housing 300 contains the necessary powered and spring-biased reels for retracting the belts 16 and 18, as well as a pair of manual screws 310 which permit manual tensioning of the belts 16 and 18 on their respective reels.

The operating position of the front tensioning assembly is depicted in FIGS. 5A–5C. In these views, the carriage 33, belt guide 38, plunger housing 304, plunger 306 and grip 308, together with inboard belt 18, outboard belt 16, and hooks 34 are shown in the position which they would occupy when affixed to the frame of a mobility aid (not shown). It will be appreciated that the reel housing 300 contains a pair of powered spring biased spools and other components which permit withdrawal of belts 16 and 18 from the spool against the spring bias by manual tension. The mobility aid occupant or vehicle operator may reposition carriage 33 to the position shown in FIG. 5A and withdraw belts 16 and 18 from the spool housing simply by sliding the carriage 33 along track 31 and pulling on the hooks affixed to belts 16 and 18 Until the system is tensioned as herein described, the belts 16 and 18 may be freely withdrawn from the retractor mechanism 39 and, likewise, will automatically withdraw into the mechanism 39 because of the spring biasing of the spools contained in the housing 300 in a fashion which is familiar to anyone who has used a seat belt in a motor vehicle.

Electromechanical operation of the front belt tension is best understood by reference to FIGS. 6A–6D. Contained within motor housing 302 are a pair of electric motors and associated transmissions (not shown). The transmissions, through a clutch assembly (not shown), drive chain sprockets 316, which in turn drive chains 318 affixed to driven sprockets 320, which are in turn affixed to the spools 322. Operation of the electric motors in the tensioning direction causes belts 16 and 18 to be wound on their respective spools, imparting tension to the belts 16 and 18 and the mobility aid to which they are attached. As will be appreciated from FIGS. 6A and 6D, a pair of manual screws 310 are likewise connected to the drive mechanism within the spool housing and are capable of imparting manual tension to the drive sprocket 316, thereby manually tensioning belts 16 and 18 in the event that electrical power to the motors is unavailable.

Although the preferred embodiment contemplates the use of electrical power as the motor driving source, it will be obvious to those skilled in the art that other power sources, such as pneumatic or hydraulic power may be used for the motors.

Figure 7:
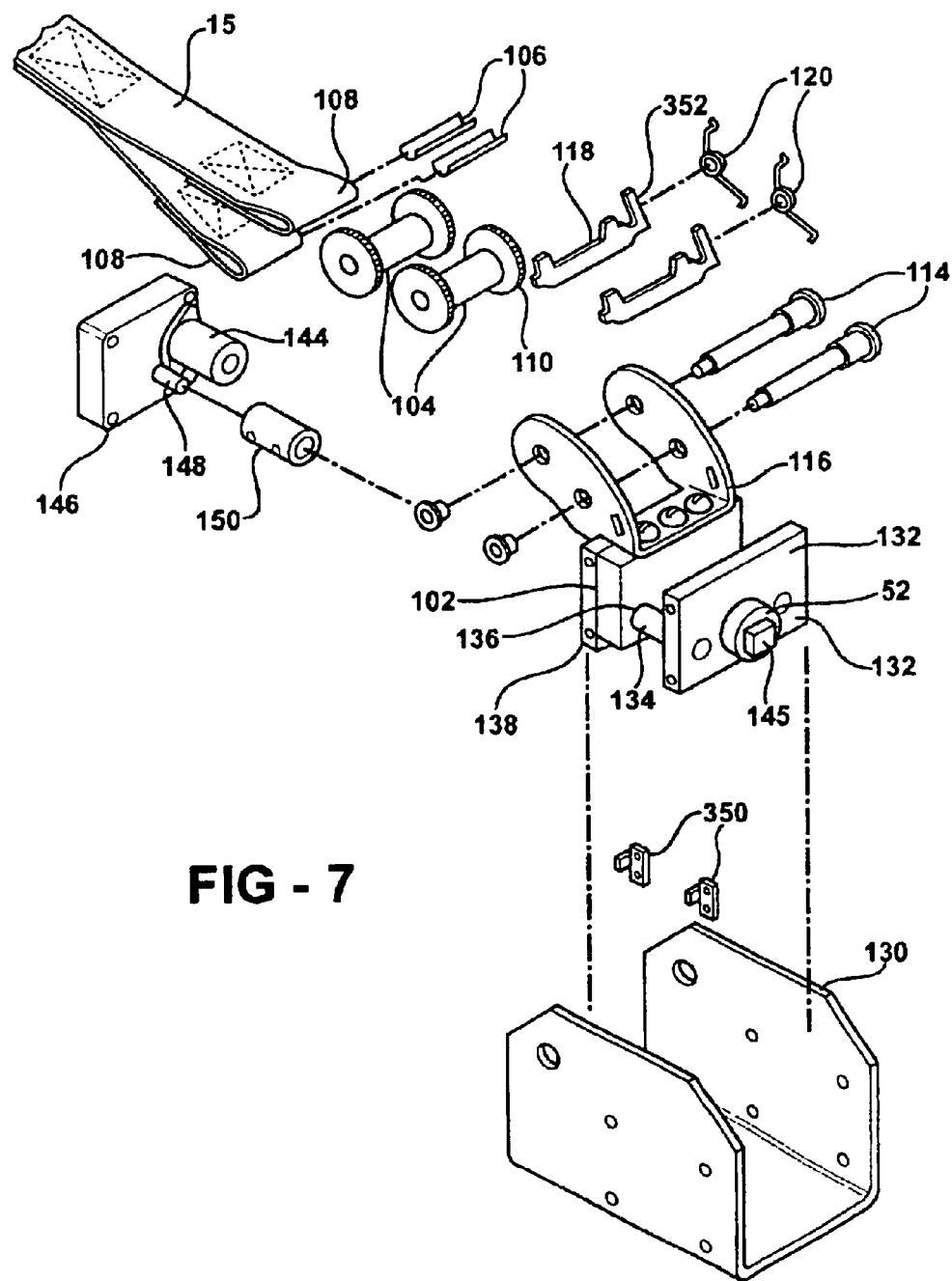
FIG. 7 is an exploded view of a second embodiment of the rear tensioning assembly.
Figure 8A:
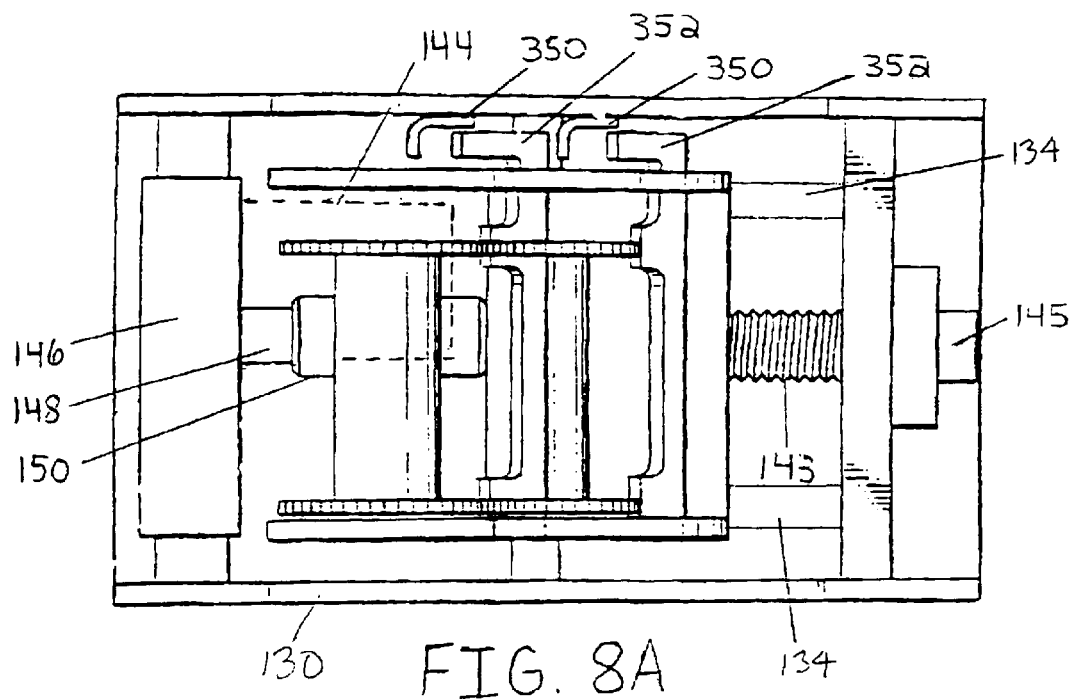
FIG. 8A is a top view of the main components of the second embodiment of the rear tensioning assembly.
Figure 8B:
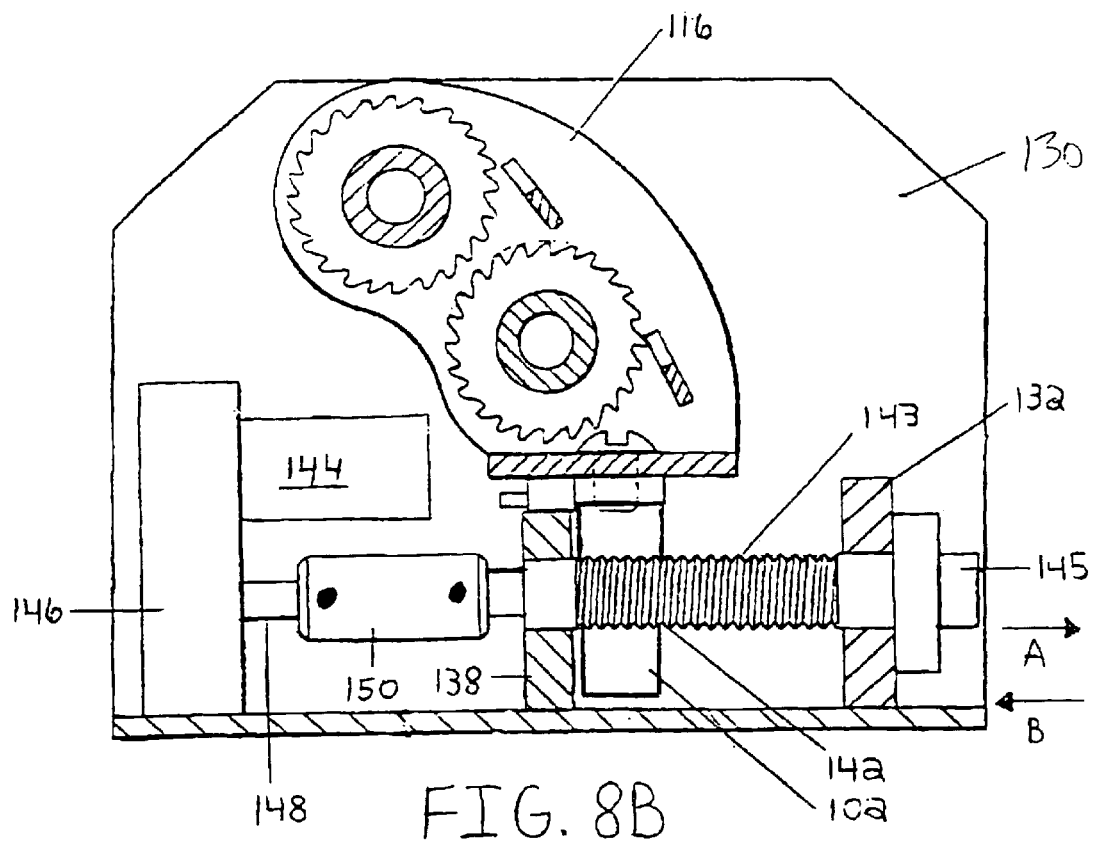
FIG. 8B is a side view of the main components of the second embodiment of the rear tensioning assembly with one side of the housing removed for clarity.

A second embodiment of the rear tensioning assembly is depicted in FIGS. 7, 8A and 8B. The tension is supplied to the belts 15 and 17 by the operation of a lead screw 52 which drives a driven block 102 for the spool to which the belt 15 is secured. The belt 15 is secured to a pair of spools 104 using keepers 106 which secure looped ends 108 of the belt 15 to the spools 104. The spools 104 are provided with toothed sprockets 110 at each end and biased by coil springs (not shown) to urge the belt 15 toward a wound or retracted position in relation to the spools 104. The spools 104 are secured by shafts 114 to a spindle bracket 116, thereby permitting rotation of the spools 104 in relation to the shaft 114, allowing the belt 15 to be wound and unwound from the spool 104. Coil springs urge the spools to cause the belt 15 to be wound up on the spools and resist withdrawal or unwinding of the belt 15 from the spools 104. Captured between the opposing faces of the spindle bracket 116 are lock pawls 118 biased by springs 120 to engage the teeth of toothed sprockets 110 of the spools 104. When the retractor assembly is in the unlocked position, springs 120 urge lock pawls 118 away from the teeth of the sprockets 110, permitting belt 15 to be freely extended from and wound to the spools 104.

Spindle bracket 116 is affixed to driven block 102 which is slidably mounted to housing 130. Fixed block 132 is secured to housing 130 in a position parallel to driven block 102. Driven block 102 is provided with guide rods 134 which are secured to the fixed block 132 and which slidably engage guide holes 136 in driven block 102. Anchor block 138 engages the distal end of guide rods 134. Fixed block 132 guide rods 134 and anchor block 138 form a guide assembly which is secured to the housing 130, and which cooperates with lead screw 52. Driven block 102 is provided with a pair of guide holes 136 and a threaded opening 142 which engages lead screw 52 The head of lead screw 52 is rotatably coupled to the fixed block 132 in such a fashion as to permit rotation of the lead screw 52 in relation to the fixed block 132, but prevent movement of the longitudinal axis of the lead screw 52 in relation to the fixed block 132. The threaded portion 143 of lead screw 52 engages the threaded opening 142 in driven block 132. Lead screw 52 is provided with a gripable head 145 for use in the event of loss of electrical power to the assembly. Rotation of the gripable head 145 of the lead screw 52 results in movement of the driven block 102 in relation to the anchor block 138 and fixed block 132 by virtue of the engagement of the threaded portion 143 of the lead screw 52 with the threaded opening 142 in the driven block 102.

Also affixed to the housing 130 is an electric motor 144, in turn coupled to a transmission 146, having an output shaft 148. Output shaft 148 is connected by means of a coupler 150 with the distal end of lead screw 52 using well known means.

Housing 130 is provided with engagement stubs 350 positioned proximate engaging tabs 352 formed in pawls 118. The position of engaging stubs 350 and engagement tabs 352 when the driven block 102 and spindle bracket 116 are mounted within the housing 130 is such that movement of the driven block 102 within the housing 130 causes engagement of the engagement stubs 350 and engaging tabs 352 as the driven block 102 with its associated components is moved in the direction shown with the arrow A in the drawing, engagement stubs 350 will contact engaging tabs 352, and this interference drives pawls 118 into engagement with the teeth of toothed sprockets 110 of the spools 104, thereby locking the spool from further rotation. This movement of the driven block 102 is a result of selective operation of the motor 144, driving lead screw 52 through transmission 146. As the driven block 102 is driven further in direction A as shown in the drawing, the now-locked spools 104 being prevented from further movement, tension on belt 15 is selectively applied.

Driving the motor 144 in the opposite direction results in movement of the driven block 102 in the direction B as shown in the drawing, simultaneously releasing tension on the belt 15 and releasing the engagement tabs 352 allowing the pawl 118 to withdraw from engagement from the toothed sprocket 110.

The basic operation of the system is shown in FIGS. 3, 9A and 9B, which include a schematic representation view of the electronics for the tensioning assemblies and a control console 60. In the preferred embodiment, control console 60 includes electronics incorporating both a drive circuit and a sensing or feedback circuit. As described above, each tensioning assembly is provided with an electric motor 24, in one embodiment, to provide rotational motion and the necessary torque to tension and relax the belts. It will be readily understood that providing electrical power and controls to such electric motors 24 is a task easily accomplished utilizing a microcontroller with associated circuitry. Cooperating with each drive motor circuit is a sensing circuit which is designed to measure the amount of current being drawn by each electric motor in the invention. Drive motor current is known to be directly proportional to the motor torque, which in turn is directly proportional to belt tension. It is known that when a desired belt tension is reached that a predicted current level is also presented to the motor drive circuit. A microcontroller based circuit within the control console 60 is preprogrammed to sense the desired current level and to turn off the drive motor when this current level has been reached. The circuit will continue to sample the tension on the belts when the system is in operation. When the circuit determines that the belts are appropriately tensioned, it will provide a signal to energize an indicator light which will visually confirm for the mobility aid occupant or vehicle operator that the mobility aid is secured. The control console is provided with a two-position switch 61 and an activation switch 63. In one switch position, the system is configured for tensioning of the belts. In the other position, the system is configured for release of the belts. After selecting the desired operation (tension or release), the activation switch 63 is utilized to energize the circuit and provide the necessary drive signals to the tensioning motors. In the tension mode, if for some reason one or more belts are not tensioned, the two indicator lights D4 and D3 will illuminate simultaneously, indicating that the system has malfunctioned. The circuit is provided with a potentiometer R1 for adjustments which allows the circuit to be easily calibrated for different belt tensions. Separate drive circuits for each motor 24 permit each belt to be calibrated in such a way as to be tensioned independently from each other belt.

Refer to FIG. 9A and FIG. 9B to understand operation of the control circuit. Power to the circuit as shown in FIG. 9A is derived from the vehicle, typically through a jack/plug assembly (not shown). 12 volt vehicle power is fed through a fuse F1, diode D5 which protects the circuit against reverse polarity, and then to an initial filter capacitor C5 selected to filter out high frequency noise and smooth out fluctuations in voltage which may occur in the vehicle's 12 volt power supply. The filtered 12 volt output feeds solid state voltage regulator U3, which converts the 12 volt input to a regulated 5 volt DC output, which is further conditioned by capacitors C4 and C3 and used to power further elements of the circuit.

The heart of the circuit is microcontroller U4, a PIC type integrated circuit incorporating a CPU, input/output functions and memory. Outputs from the microcontroller U4 are fed through an array of MOSFETs Q3, Q4, Q5 and Q6 to solid state relays RLY3, RLY4, RLY5 and RLY6, which in turn, control the tensioning motors 24 associated with each belt tensioning apparatus. Feedback from each relay RLY3–6 is fed through an associated operational amplifiers U1 and U2 which conditions the sense signals, which are in turn presented to the microcontroller U4. The condition of the circuit is displayed on either or both of two light-emitting diodes D3, D4, also driven by outputs from the microcontroller through transistors Q7 and Q8.

The microcontroller U4 is equipped with thirteen programmable input/output pins; in the present application, seven were selected as output pins, and six selected as input pins. This selection is done in software. Four of the output pins control current to each of the four motors 24, two control the tension and release signaling light-emitting diodes D3, D4 and the remaining output pins control the coils of relays RLY3-6. The six input pins are assigned to monitor the condition of the tension/release SPDT switch 61, the "activation" switch 63, and the four current sensing comparators. The clock of the microcontroller U4 is controlled by a simple R-C circuit (not shown), thus avoiding the need for a crystal to determine timing.

The current sensing portions of the circuit comprise an array of four operational amplifiers U1 and U2, all co-located in a single chip package. FIG. 9B shows one complete circuit for a single op-amp/comparator/relay/monitor circuit, which is representative of each of four circuits required for operation of each motor 24. When the activation switch 63 is operated, the microcontroller U4 senses the closure of the switch by determining a "ground" condition, and waits until the signal at the corresponding pin of the microcontroller U4 has returned to a positive voltage. The microcontroller U4 then sends a signal resulting in power being applied to all motors 24 by turning on the various MOSFETs Q3–Q6, which short to ground. Current in each motor 24 increases rapidly at first, to more than 0.5 amperes, and then falls back to a value of about 150 milliamperes. The sensing circuits ignore the initial surge in current, based on program instructions within the microcontroller U4 to ignore the sensing inputs for the first two hundred milliseconds. As tension begins to build up on the belts 15, 16, 17 and 18, current in the motors 24 increases in direct proportion to the torque load. As soon as the current through the one ohm sensing resister R10 reaches a predetermined threshold (selectable by potentiometer R1), the comparator circuit is turned to the ON state, and this state is sensed by the microcontroller U4 which then turns off the drive to that particular motor 24. The potentiometer R1 can be preadjusted to correspond to a set of values of belt tension or it can be replaced by an equivalent value of fixed resistor to always turn its corresponding motor off when the set value of belt tension is reached. The potentiometer R1 can be located remotely outside of the control console 60 for rapid, infinitely adjustable tension values within preset range or replaced by stepping or switch selectable fixed resistors for stepwise selected tension values. When all drive motors 24 have been turned off, the "tension" light-emitting diode is illuminated.

Each of the four relays RLY3–RLY6, in the form of a DPDT plus 12 volt DC coil device, is configured as part of an "H" circuit to control the direction of current through each motor 24. In the "tensioning" position, the current is directed through the NO (normally open) points of the left hand contacts of the relay, via the common point, through the motor, via the right hand common point and through the NO contacts to ground. In the "release" position, the current flows via the right hand NC (normally closed) contact, through the motor, and through the left hand contact. The position of the relays RLY3–RLY6 is controlled by the microcontroller U4, which in turn sets the relays based on the position of the switch 61. As a result, the operator can "toggle" the tension/release switch 61 while the motors are running without effect. Basically, the tension/release relays are isolated from the tension/release switch 61 by the microcontroller U4. The relays and motors 24 are protected by clamping diodes D1 and D2. The inputs to the operational amplifiers U1 and U2 are conditioned and balanced by the associated input circuitry consisting of a network of resistors and capacitors, in a well known fashion.

As shown in FIGS. 10A and 10B, microcontroller U4 is permanently programmed with a tensioning routine scripted in the language of the microcontroller. Although the routine of FIGS. 10A and 10B is configured for the 16F84 series PIC, it will be easily understood that similar microcontrollers with comparable programming routines may easily be substituted for the 16F84 and its example program. The program includes a series of subroutines, including subroutines for initializing the operation of the system, routines for illuminating the light-emitting diodes, delay sub-routines and motor stop and start sub-routines The operation of the program is straightforward, beginning with initialization of designated ports A and B. Assuming that a signal to operate the system to the locked position has been given, the program establishes a preliminary count of rotational steps for each of the four motors 24 associated with this system, and then turns off the indicator light-emitting diodes D3, D4, and resets all relays RLY3–RLY6. The program then instructs the relays RLY3–RLY6 to close, sending current to all four motors 24. After a short delay, the program checks for the tension on each motor 24. If the current to any motor 24 is sensed to be sufficiently high as to indicate that tension has been applied, the program instructs the relays RLY3–RLY6 driving that motor 24 to turn off. Once all four motors 24 have been turned off, the program causes the "tension" light-emitting diode to illuminate. If a pre-determined time period (e.g., 2 seconds) has elapsed without achieving tension on all motors 24, the program instincts the microcontroller to turn on both light-emitting diodes D3, D4, signaling the operator that a fault has occurred in the tensioning process.

The same tension-sensing software and hardware is utilized to effectuate release of tensioning on the belts. When the motors 24 are to be driven in the "release" direction, operation of the tension/release switch 61 to the "release" position conditions the circuit for driving the motors 24, through the relays RLY3–RLY6. As this physical limit is reached, the circuit senses the increase in current draw to the motor 24 as it stalls. As the current increases in direct proportion to the torque load and reaches a predetermined threshold (again, selectable by the potentiometer R1 or fixed resistor), the comparator is turned to the on-state, which is sensed by the microcontroller U4, which in turn turns off the drive current to each particular motor 24. When all drive motors 24 have been turned off, the "release" light-emitting diode is illuminated.

In operation, therefore, once the mobility aid has been positioned in the station, the mobility aid occupant or the vehicle operator unstows each of the four belts from its retracted position and attaches each associated hook to the appropriate corner portion of the mobility aid. Once the four belts have been so positioned, the mobility aid operator or vehicle operator positions the switch 61 to the "tension" position and actuates the "activation" switch 63 This operation sets into motion the automatic tensioning and feedback logic contained within the controller unit 60, driving the appropriate belt tensioning motors to their desired tensions, thereby securing the mobility aid from both fore and aft, lateral and vertical movement within the vehicle. Power to the motors is then removed, effectively locking the tensioning belts in their desired tensioned position.

Release of the mobility aid from the mobility aid station is accomplished by moving the switch 61 to the release position and activation of switch 63 which results in a release of the tension on all belts, as a result of driving the motors 24 associated with the tensioning assemblies in the reverse direction from the tensioning direction. As soon as sufficient slack has been created in the belt tensioning system, the motors 24 are automatically de-energized, allowing the hooks and belts to be released from the mobility aid.

In addition, the system is provided with manually operable elements coupled to the drive mechanisms associated with each retractor. In the event of a power failure to the system, the retractor mechanisms may, accordingly, be operated by hand, providing both tension and release of tension to permit securement and release of the mobility aid in the absence of power to the system.

Having described my invention in detail, it will nevertheless be obvious to those skilled in the art to make numerous minor modifications thereto without departing from the essence of my invention.

We claim:

1. An apparatus for securing a mobility aid to the interior of a motor vehicle comprising:
   a mobility aid station;
   at least one first anchor point on one side of said station;
   at least one second anchor point on an opposite side of said station;
   at least one first flexible element having a distal end and a proximal end removably securable, at its distal end, to a first portion of said mobility aid and secured at its proximal end to said at least one first anchor point;
   at least one second flexible element having a distal end and a proximal end removably securable, at its distal end, to a second portion of said mobility aid, and secured at its proximal end to said at least one second anchor point;
   tensioning means for supplying a selective amount of tension to at least one of said first and second flexible elements; and
   control means located remotely from said tensioning means for controlling said selective amount of tension applied by said tensioning means.

2. The invention of claim 1, wherein said tensioning means is powered.

3. The invention of claim 2, wherein said power is electrical.

4. The invention of claim 2, wherein said power is pneumatic.

5. The invention of claim 2, wherein said power is hydraulic.

6. An apparatus for securing a mobility aid to the interior of a motor vehicle comprising:
   a mobility aid station;
   at least one first anchor point on one side of said station;
   at least one second anchor point on an opposite side of said station;
   at least one first flexible element having a distal end and a proximal end removably securable, at its distal end, to a first portion of said mobility aid and secured at its proximal end to said at least one first anchor point;
   at least one second flexible element having a distal end and a proximal end removably securable, at its distal end, to a second portion of said mobility aid, and secured at its proximal end to said at least one second anchor point;
   tensioning means for supplying a selective amount of tension to at least one of said first and second flexible elements; and
   control means located remotely from said tensioning means for controlling said selective amount of tension applied by said tensioning means, and electrical feedback means for determining the amount of tension supplied.

7. The invention of claim 6, wherein said tensioning means is powered.

8. The invention of claim 7, wherein said power is electrical.

9. The invention of claim 7, wherein said power is pneumatic.

10. The invention of claim 7, wherein said power is hydraulic.

11. The invention of claim 1, which further comprises a control circuit for sensing the amount of said tension.

12. The invention of claim 11, which further comprises a second control circuit for adjusting the amount of said tension.

13. The invention of claim 1, wherein at least one of said first and said second anchor points is selectively repositionable in said vehicle.

14. An apparatus for securing a mobility aid to the interior of a motor vehicle comprising:

a mobility aid station;

at least one first anchor point on one side of said station;

at least one second anchor point on an opposite side of said station;

at least one first flexible element having a distal end and a proximal end removably securable, at its distal end, to a first portion of said mobility aid and secured at its proximal end to said at least one first anchor point;

at least one second flexible element having a distal end and a proximal end and removably secured, at its distal end, to a second portion of said mobility aid, and at its proximal end to said at least one second anchor point;

tensioning means for supplying a selective amount of tension to at least one of said first and second flexible elements;

locking means for maintaining said selective amount of tension on said tensioning means; and control means located remotely from said tensioning means for controlling said selective amount of tension applied by said tensioning means.

15. The invention of claim 1, which further comprises a control console for activating or deactivating said tensioning means.

16. The invention of claim 15, wherein said control console is mounted adjacent to said station.

17. The invention of claim 15, wherein said control console is mounted remotely from said station.

18. The invention of claim 14, which further comprises a control console for activating or deactivating said tensioning means.

19. The invention of claim 18, wherein said control console is mounted adjacent to said station.

20. The invention of claim 18, wherein said control console is mounted remotely from said station.

21. The invention of claim 6, wherein said feedback means is adjustable.

22. The invention of claim 14, wherein at least one of said at least one first and said at least one second anchor points is selectively repositionable in said vehicle.

23. The invention of claim 1, further comprising means for positioning said distal end of said at least one of first flexible element and said at least one second flexible element away from a floor of said motor vehicle, whereby said distal end may be grasped by a user of said mobility aid.

24. The invention of claim 14, further comprising means for positioning said distal end of said at least one of first flexible element and said at least one second flexible element away from a floor of said motor vehicle, whereby said distal end may be grasped by a user of said mobility aid.

* * * * *